(12) United States Patent
Tan

(10) Patent No.: US 6,301,679 B1
(45) Date of Patent: Oct. 9, 2001

(54) SYNC BYTE PADDING

(75) Inventor: Ewe Chye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/608,375

(22) Filed: Jun. 30, 2000

Related U.S. Application Data (60) Provisional application No. 60/162,273, filed on Oct. 28, 1999.

(51) Int. Cl.[7] .............................. G11C 29/00; G11B 5/09
(52) U.S. Cl. ........................ 714/723; 714/769; 360/31; 360/47; 360/53; 369/47; 369/58
(58) Field of Search ..................................... 714/1–6, 710, 714/723, 765, 766, 769–773; 360/31, 47, 53, 77.05, 78.09; 369/47, 58; 711/4, 202

(56) References Cited

U.S. PATENT DOCUMENTS

| | | | |
|---|---|---|---|
| 4,914,530 | 4/1990 | Graham et al. | 360/48 |
| 5,235,585 | 8/1993 | Bish et al. | 369/53.17 |
| 5,276,662 | 1/1994 | Shaver, Jr. et al. | 369/32 |
| 5,357,381 | 10/1994 | Yasuda et al. | 360/53 |
| 5,367,652 | * 11/1994 | Golden et al. | 714/4 |
| 5,563,746 | 10/1996 | Bliss | 360/53 |
| 5,740,358 | 4/1998 | Geldman et al. | 714/47 |
| 5,751,733 | * 5/1998 | Glover | 714/765 |
| 5,930,068 | * 7/1999 | Gregg et al. | 360/77.05 |
| 5,935,261 | 8/1999 | Blachek et al. | 714/42 |
| 6,034,831 | 3/2000 | Dobbek et al. | 360/53 |
| 6,052,804 | 4/2000 | Thowe et al. | 714/710 |
| 6,239,931 | * 5/2001 | Chung et al. | 360/53 |

FOREIGN PATENT DOCUMENTS

| | | | |
|---|---|---|---|
| 0 428 208 A2 | 5/1991 | (EP) | G11B/20/18 |
| 0 541 219 A1 | 5/1993 | (EP) | G11B/20/12 |
| 1 404 541 A | 9/1975 | (GB) | G11B/27/00 |
| 11 297006 | 10/1999 | (JP) | G11B/20/18 |
| 11 297004 | 1/2000 | (JP) | G11B/20/18 |

* cited by examiner

*Primary Examiner*—Emmanuel L. Moise
(74) *Attorney, Agent, or Firm*—Merchant & Gould PC; Jeramie J. Keys (57) ABSTRACT

A method and system that map the defects on the storage media of a disc drive. The method and system calculate the position of the defect and from that position determine the sector that must be flagged as unusable. The method and system also detect the distance the defect lies from an adjacent sector and flags the adjacent sector as unusable if the defect is too close because the defect may grow over time and eventually invade the adjacent sector. Also a method and system that efficiently utilize the space between all of the servo bursts by filling the space with sectors during the defect mapping process and marking the sectors with defects and those too close to the defect as unusable rather than shifting the sectors within the track area to avoid the defect.

17 Claims, 4 Drawing Sheets

SYNC BYTE PADDING

RELATED APPLICATIONS

This application claims the benefit of the filing date of United States Provisional Patent Application Serial No. 60/162,273 filed on Oct. 28, 1999 and entitled "SYNC BYTE PADDING."

FIELD OF THE INVENTION

This application relates to hard disc drives and more particularly to an apparatus and method for detecting error locations on the storage media and eliminating future drive errors resulting from media defects that grow over time.

BACKGROUND OF THE INVENTION

In a disc drive data is recorded on a disc in concentric, circular paths known as tracks. Servo bursts are written in each track on the disc and contain position information. The servo bursts are positioned along radial slightly wedged shaped quasi-lines that cross the circular tracks and divide the disc. The disc is formatted before user data is stored on the disc, and the format creates a number of sectors in the track area that lies between each pair of adjacent servo bursts. The number of sectors may vary from one track area to the next. During operation the disc continually rotates and a read/write head a given radius from the center of the disc reads or writes data in a given track. An actuator arm swings the head in an arc across the disc surface to allow the head to read or write data in different tracks.

Figure 31:
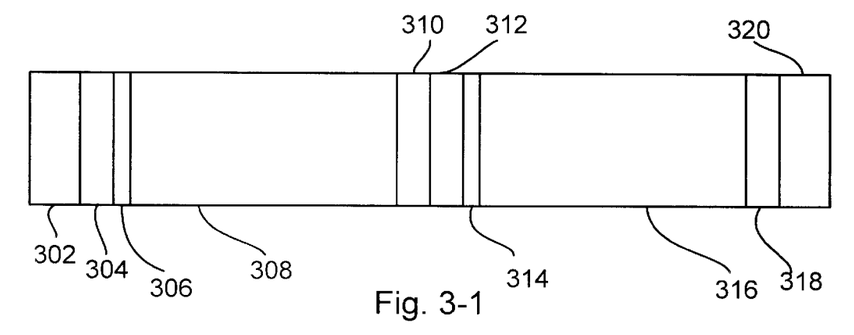

Each sector located in each track area formed between the adjacent servo bursts contain several informational sections. With respect to FIG. 3–1, a track area between adjacent servo bursts is shown. The area contains two sectors with each sector containing several sections. The actual number of sectors between servo bursts is not limited to any specific number and will vary from drive to drive. These sections include a phase lock oscillator (PLO) section which provides the read and write parameters for the sector that are used by automatic gain control circuitry. A sync byte section is included to signal the beginning of a user data section where the application information is stored. An error correction code (ECC) section is typically provided after the user data section and permits correction of user data read back errors. After the ECC, a new section begins with another PLO section. This sector layout containing the several sections and the function and contents of each section are well known in the art.

The disc or magnetic storage media of the disc drive containing these sectors is susceptible to defects such as thermal asperities. The defects cause errors to occur during operation of the disc drive if the defect is of a significant size for the particular section or sections of the sector in which it lies. If the defect lies in the user data section, the ECC may be able to correct any resulting read error if the defect is not too large. If the defect lies within the ECC, the ECC's redundancy may account for any error. If the defect lies within the sync byte or the PLO, a relatively small defect may be enough to cause the sector to fail and the ECC cannot account for errors in the PLO and sync byte. If the disc drive electronics cannot properly set the gain and frequency for read back of the user data and cannot properly determine when to start the user data read back, invalid data will result.

Therefore, defect detection processes have been employed to find the defect and shift the sectors' positions within the track area so that the defect either lies in a section that allows the defect to be compensated for, such as the user data section or the ECC section. If the defect is too large in these sections, then the sector must be marked as unusable. This shifting process successfully avoids errors due to the defect, but such shifting processes require extra space to be dedicated within the servo bursts and this extra space reduces the storage capacity of the disc drive.

Furthermore, these defects in the storage media can grow over time. If the error is located near the end of the sector, future errors may result if that defect grows into the trailing sector. Even if the defect is initially large enough to force the sector to be marked as unusable, the defect may grow beyond the end of this unusable sector and may interfere with the PLO and sync byte of the trailing sector that was previously determined to be usable. This defect's growth into the trailing sector will cause the disc drive to eventually fail because the potential for growth of the defect has not been accounted for in the defect mapping process.

SUMMARY OF THE INVENTION

The present invention addresses the problems discussed above and other problems by filling the storage medium with sectors containing a test pattern and reading the test pattern to find errors. The sectors containing defects and those that are too close to the defect are located and marked as unusable and all other sectors are given a logical address. No shifting space is required and the space normally allocated for shifting is filled with usable sectors. The present invention also addresses the problems discussed above by determining whether the error in a sector lies too closely to an adjacent sector and if it does the adjacent sector is marked as unusable to avoid becoming invalid if the defect grows in the future.

The invention is embodied in a method for mapping defects on the storage media of a disc drive. The method includes calculating a position of a defect. A current sector corresponding to the position of the defect is flagged as unusable. A distance of the defect to a sector adjacent to the current sector is compared against a distance threshold. The adjacent sector is flagged as unusable when the distance is less than the distance threshold.

The invention is also embodied in a control system that maps defects on a storage media of a disc drive. The control system includes a read/write channel that reads a signal from the storage media to detect a defect and the defect's location. A processor calculates the position of the defect on the storage media as a function of the defect location. The processor flags a sector corresponding to the position of the defect as unusable and compares against a distance threshold a distance of the defect to an adjacent sector. The processor flags the adjacent sector as unusable when the distance is less than the distance threshold.

Also included in the embodiments is another method for mapping defects on the storage media of a disc drive. The method involves creating a plurality of large sectors to fill the storage media. Reference data is written to the large sectors to produce stored data. The stored data is read back and compared to the reference data to detect errors. The byte number of each defect is found. The normal sector and byte position of the defect is calculated by subtracting the sector frequency from the defect's byte number. A normal sector corresponding to the position of a defect is then flagged as unusable. The method may further include comparing a distance of the defect to an adjacent sector against a distance threshold. The adjacent sector is flagged as unusable when the distance is less than the distance threshold.

These and various other features as well as advantages which characterize the present invention will be apparent from a reading of the following detailed description and a review of the associated drawings.

BRIEF DESCRIPTION OF THE DRAWINGS

FIG. 3-1 depicts the positioning of the sections of normal sectors in a track area between adjacent servo bursts in a disc drive when in the normal user mode of operation.

FIG. 3-2 illustrates the positioning of the sections of a large sector in a track area between adjacent servo bursts in a disc drive when in the defect mapping mode of operation.

FIG. 4-1 shows the operational flow for the write process used in the defect mapping scheme implemented by one disc drive embodiment of the present invention.

FIG. 4-2 illustrates the operational flow for the read and detect process used in the exemplary defect mapping scheme.

DETAILED DESCRIPTION

A disc drive contains many elements that cooperate to map the defects in the storage medium of a disc drive. Among these elements, a control system writes a test pattern to the media and then reads it back to locate the defects. Control system embodiments of the present invention write the test data and then read it back and store the sector locations of the defects allowing the defective sectors to be marked unusable. Furthermore, the control system detects whether the defects within the sector lie too closely to the trailing sector and marks the trailing sector unusable if the defect is too close.

Figure 1:
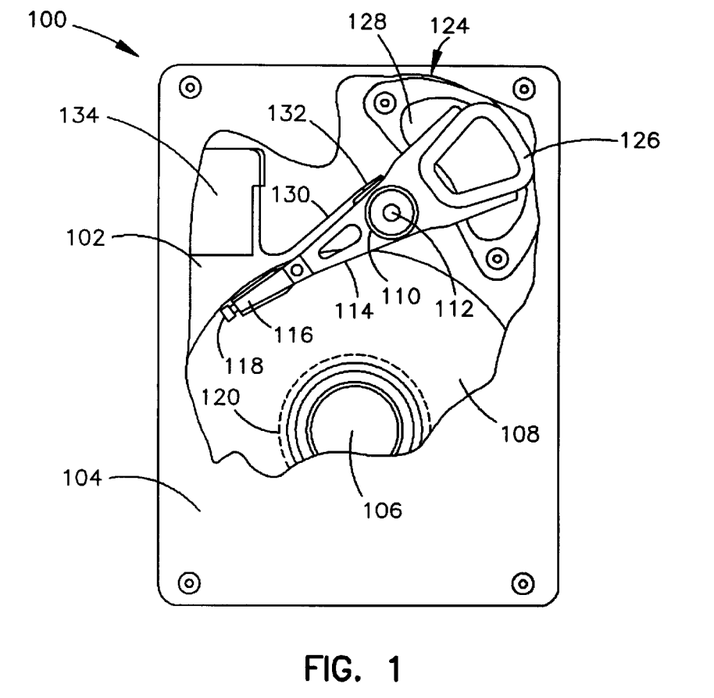
FIG. 1 is a schematic representation of a disc drive in which preferred embodiments of the invention operate.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
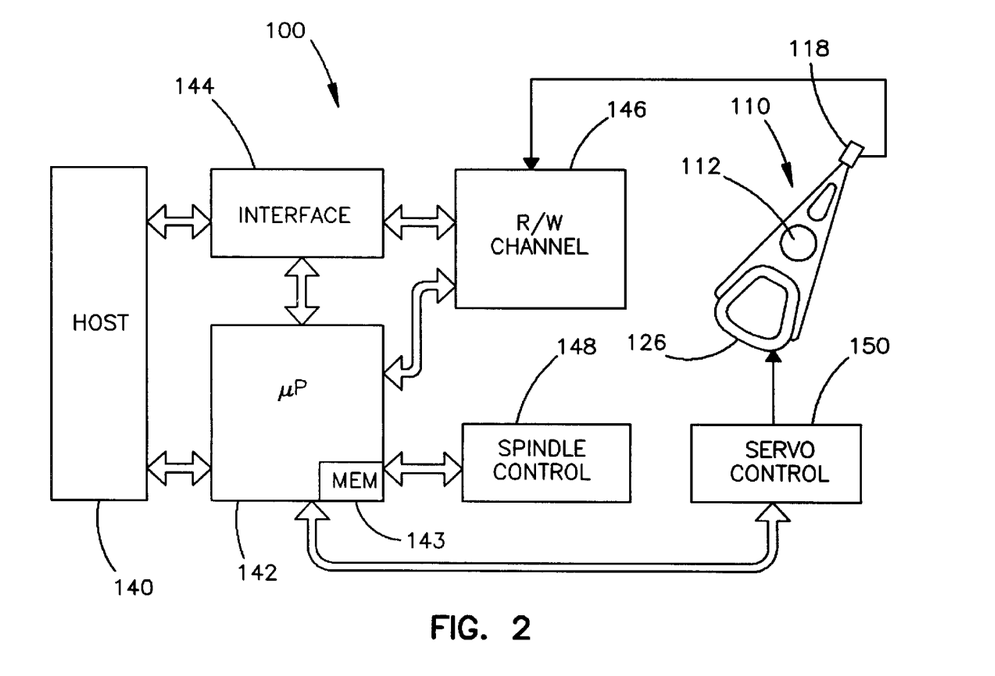
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations as indicated by the ECC and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

A sequencer (not separately shown), which typically is an integrated component of the interface circuit 144, interfaces with the disc drive microprocessor 142, the buffer, and the read/write channel 146. The function of the sequencer is to control the read and write operations of the read/write channel 146 by interpreting the PLO and sync byte information and by directing data into and out of the buffer in the host interface 144. The sequencer receives the data location information from the microprocessor 142 including both the location of data on the storage media and the location of data within the buffer in the interface 144. The sequencer also receives information including the size of the PLO, the sync byte, and the presence of the ECC from the microprocessor 142 which the sequencer subsequently uses to interpret and correct the information received through the read/write channel 146.

When the disc drive is manufactured, the storage media will contain defects that must be located and accounted for so that drive failures do not result. According to an embodiment of the present invention, during the manufacturing process the buffer is loaded with programming to be executed by the microprocessor to perform a defect mapping scheme. The microprocessor 142 executes the mapping routine by generating commands that are provided to the sequencer and the read/write channel 146. The sequencer and the read/write channel 146 write test signals stored in the buffer to the storage media and then read those signals back. The read/write channel compares a signal threshold to the signal level that is read back to detect defects by finding weak signals.

With reference to FIG. 3-1, the layout of sectors within a track area between servo bursts 302 and 320 that result from a disc format are shown. This layout is used when the drive is under user operation. The first section 304 of the first sector located just behind the servo burst 302 is the phase lock oscillator section. This section contains signals that are read by the disc drive electronics to control settings in an automatic gain control circuitry of the control system. These settings include the amplitude and phase at which the data signals are written, and these settings enable the disc drive to properly read the user data stored on the disc. Following the PLO section 304 is the syncbyte section 306. This section is a marker that tells the disc drive electronics that the PLO section has ended and the next section to be read contains user data.

After the sync byte 306, user data is stored in section 308. This section contains the data that is used by the host computer to perform desired operations. The disc drive reads the user data and supplies it to the host upon request. The section following the user data section is the error correction code section 310. This section 310 contains the ECC that the disc drive utilizes to detect and correct errors as the user data is read during operation of the drive. This sector layout containing the several sections and the function and contents of each section are well known in the art.

After the ECC section 310 of the first sector comes the PLO section 312 of the next sector. This PLO section 312 performs the same task as the PLO section 304 for the first sector. Following the PLO section 312 is the sync byte section 314, the user data section 316, and then the ECC section 318. Because the illustrated track area is shown with only two sectors, the ECC section 318 is followed by the next servo burst 320.

Figure 32:
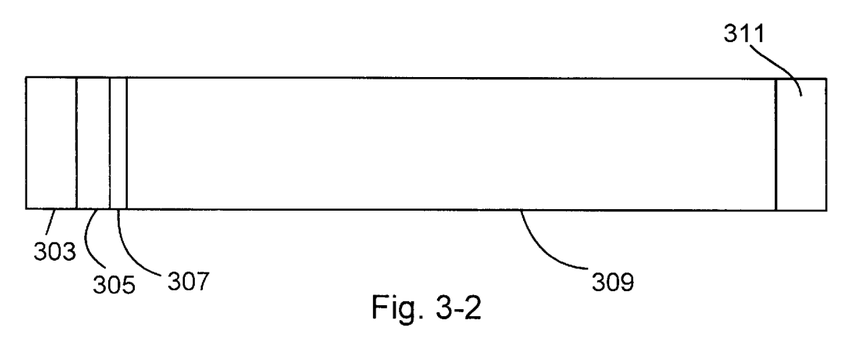

Defects can occur at any position within the track area between the servo bursts 302 and 320. These defects must be mapped and accounted for when determining the proper sector to store user data. Exemplary embodiments of the present invention map these defects before the format creating the sectors is performed. Rather than writing all of the normal sectors between servo bursts as shown in FIG. 3-1, exemplary embodiments of the present invention write one large test sector that fills the area between the servo bursts, as can be seen in FIG. 3-2.

FIG. 3-2 shows the track area between servo bursts produced by an embodiment of the present invention while executing the defect mapping routine. For simplicity, this embodiment creates a single track area sector that has only one PLO section 305 and one sync byte section 307 that trail the leading servo burst 303. After the first PLO section 305 and sync byte section 307, the remainder of the section 309 is used for writing a test pattern up to the trailing servo burst 311. As will be discussed below, the precise location of a defect is found relative to the positions of the normal sectors, as shown in FIG. 3-1, that will be formatted into the drive after the mapping scheme is complete even though those sectors are not delineated by their own PLO and sync byte during the mapping routine.

Figure 41:
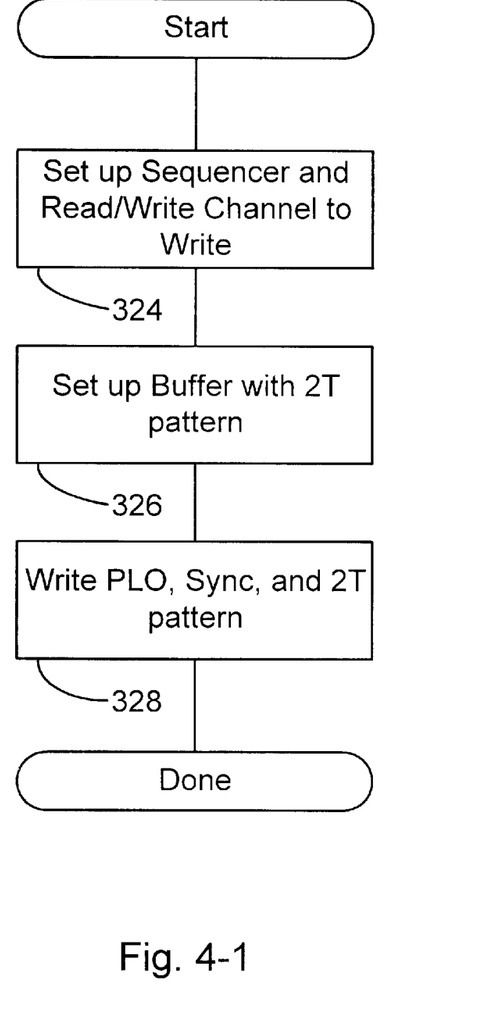

FIG. 4-1 illustrates the operational flow of the write portion of the defect mapping scheme. The write portion begins at sequencer operation 324. At this operation, the microprocessor 142 sends a write instruction to the sequencer. This write instruction includes several important pieces of information for each sector to be written. The information includes the location of the sector to write, the length of the PLO to be written, the length of the sync byte to be written, and the size of the data sector in terms of bytes. Along with the sequencer instruction, the microprocessor 142 sends an instruction to the read/write channel 146 indicating the frequency at which the test pattern should be written in terms of bytes per sector.

In this defect mapping scheme, the read/write channel 146 usually writes data that is known in the art as a 2T pattern into the test data section 309. A 2T pattern is similar to a digitized sine wave. To accomplish the 2T pattern, the data that forms the pattern is loaded into the buffer at buffer operation 326. Write operation 328 occurs once the microprocessor 142 instructs the sequencer to begin the writing process. This instruction causes the sequencer to begin retrieving the 2T pattern from the buffer and providing the pattern to the read/write channel where it is encoded and placed on the storage media. After the 2T pattern has been applied, the write portion ends.

As shown in FIG. 3-2, during this write portion the read/write channel 146 in one embodiment creates a single sector that fills the entire space between the servo bursts 303 and 311 without leaving any empty shifting space. This process allows the entire track area to be utilized when no errors are found. The lack of shifting space is made possible because during the defect location routine, once a defect is found in the area to be occupied by the PLO, sync byte, and the ECC, the normal sector that will be created by the format is flagged as unusable rather than shifting the sectors around the defect. Thus, space is only wasted if a defect actually exists whereas space would be wasted regardless of whether a defect existed if shifting space had been provided.

Figure 42:
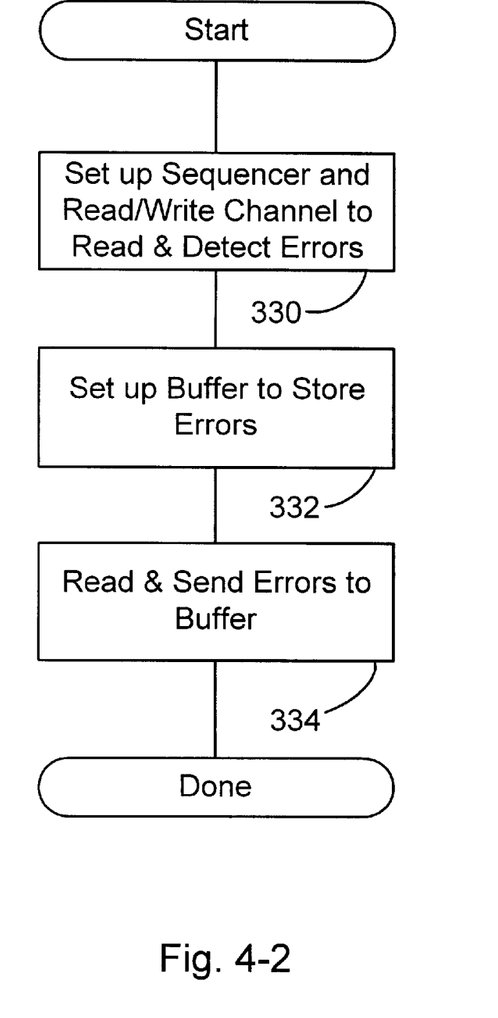

FIG. 4-2 illustrates the read portion of the defect mapping scheme. This portion begins when the microprocessor 142 instructs the sequencer and read/write channel to prepare to read the information previously written including the PLO, sync byte, and 2T pattern for each large sector at sequencer operation 330. Included in the instruction to the sequencer is the location of each sector to read, the length of the large sector's PLO, the length of the large sector's sync byte, and the size of the data sector. Also included is an instruction to not attempt ECC correction, an instruction to not attempt retries, an instruction to use a special counting mode for retrieving the 2T pattern, and an instruction providing the location in the buffer where the defect location information should be placed. Along with the sequencer's instructions, the microprocessor 142 sends an instruction to the read/write channel including the frequency with which to read the 2T pattern and a command to use a special detect defect mode.

The special modes for the sequencer and the read/write channel 146 differ from the operation that they perform during normal disc drive use. The special detection mode of the read/write channel 146 causes the channel to compare the peaks of the received signal during the read process to a signal threshold set to indicate the presence of a defect. When the channel detects a signal peak below the signal threshold, a defect indicator is produced. This indicator is single byte value. When the peak is above the signal threshold, a non-defect indicator is produced, which is the other value the bit may attain. Ordinarily in the normal operation mode, the read/write channel sends NRZ (non-return to zero) data to the sequencer to indicate the presence of data bit values.

The sequencer's special count mode is configured to count the bytes received from the channel to detect defects and properly indicate their location. Keeping track of the byte values received enables the sequencer to place a defect marker in the buffer once a defect indicator byte is received. Placing the defect marker in the buffer location is necessary for enabling the microprocessor 142 to locate the defect's location on the storage media. The buffer has a memory location designated for each large sector for each track. The sequencer counts the number of bytes received for each large sector of a current track and inputs the count number for each defect detected in the memory location allocated for that large sector and track.

Once the sequencer and read/write channel are setup to read, the microprocessor 142 instructs the buffer to store the errors as output by the sequencer at buffer operation 332. Then, the microprocessor 142 sends a read command to the sequencer at read operation 334. The sequencer then triggers the read/write channel which begins to feed the byte values to the sequencer indicating whether a defect is present. The sequencer directs the defect byte number to the appropriate location in the buffer. Once all of the 2T pattern has been read for the disc drive, the read portion of the routine ends for that space.

Figure 5:
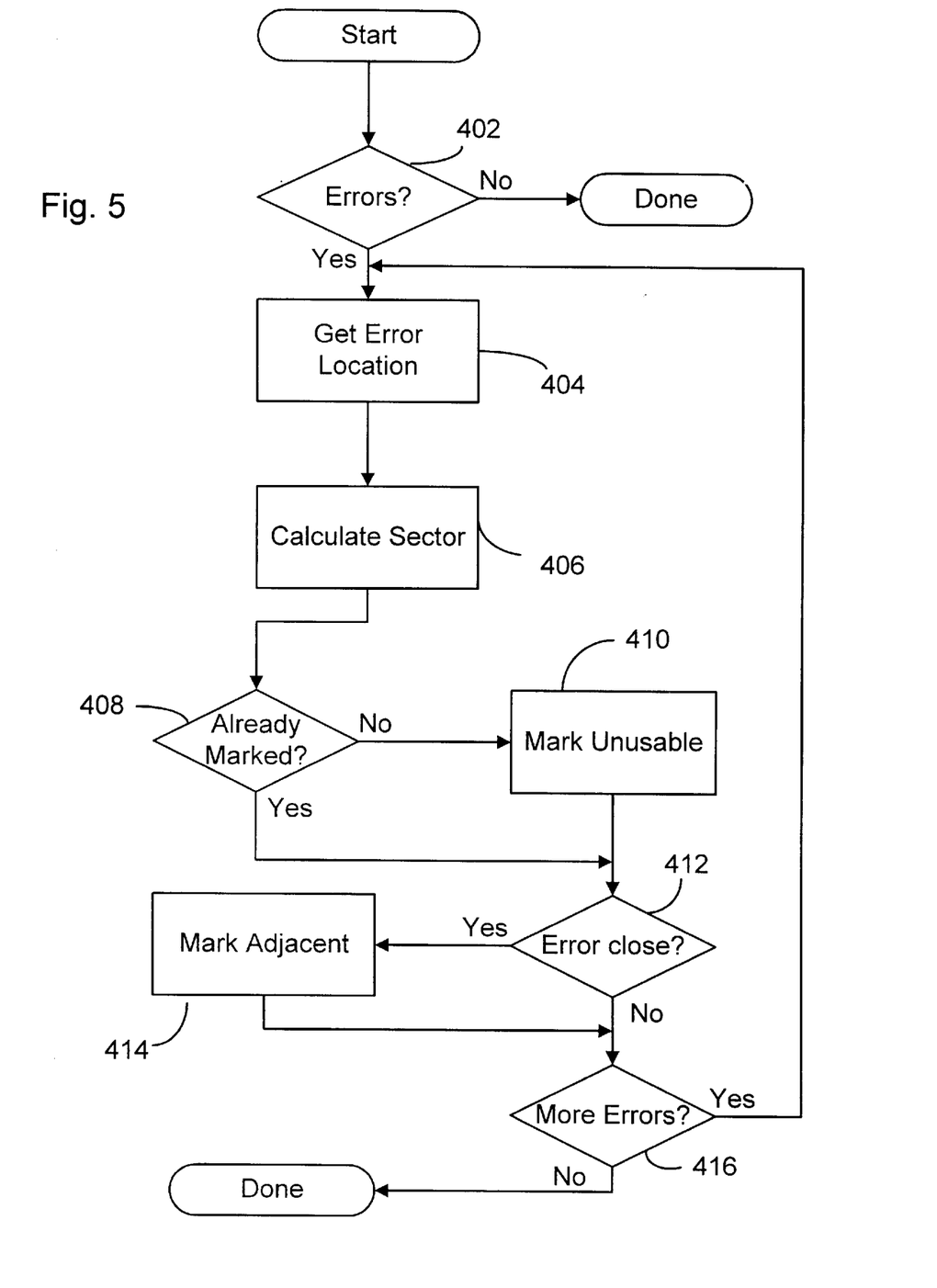
FIG. 5 shows the operational flow for a defective sector marking routine used in the exemplary defect mapping scheme.

After the locations of the defects for the disc drive have been stored in the buffer, the microprocessor 142 begins a defect marking scheme which cycles through the defects. The microprocessor calculates the location of the defect based upon the format of the track area that will be created after the mapping scheme is completed where several sectors (normal sectors each with a PLO, sync byte, data section, and ECC as in FIG. 3-1) exist between adjacent servo bursts on a track. The microprocessor 142 finds the normal sector and byte position within that normal sector that contains the defect. The microprocessor 142 also detects whether the normal sector and/or its trailing normal sector should be marked as unusable. The routine begins with query operation 402 detecting whether any errors were found in the current track area being analyzed. The programming stored in the buffer enables the microprocessor 142 to know the area in the buffer that contains the information relevant to the current track area under consideration and the microprocessor 142 accesses that information accordingly.

If query operation 402 finds no errors for the current track area between two adjacent servo bursts, the routine for that area ends. The microprocessor 142 will start the routine again for the next track area between the next two adjacent servo bursts if all track areas have not yet been analyzed. If query operation 402 finds errors in the current track area, then control moves to location operation 404. At this operation, the microprocessor 142 determines the location of the error within the track area with reference to the burst ID and byte number of the error stored in the buffer.

Using the error's byte number stored in the buffer, sector operation 406 calculates which normal sector and which byte within the normal sector contains the error. The sector is found by first subtracting the PLO and sync byte lengths of the large sector from the normal sector length to produce a first value. This is done because the bytes forming the PLO and sync byte are not counted in the byte count forming the byte number. Then, the first value is subtracted from the error's byte number which is an initial defect count number that is stored in the buffer to produce a new defect count number.

The length of the normal sector is subtracted from the last new defect count number to produce another new defect count number. The subtraction is repeated as many times as necessary to reach zero or a negative value with a new defect count number being produced after each subtraction. The number of subtractions from the initial defect count number necessary to achieve zero or a negative value indicates the normal sector within the track area between bursts that contains the defect. The byte is then found by storing the last new defect count number that was produces before reaching a negative number or zero.

For example, assume the normal sector length is 600 bytes and the track area between bursts will contain three normal sectors. The large sector is, therefore, 1800 bytes wide. Assume the PLO and sync byte of the large sector occupies 20 bytes total, and assume the initial defect count number (error byte number) stored in the buffer for the current defect is 1100.

Subtracting 20 from 600 leaves 580, which provides the number to first subtract from the defect's error byte number. Subtracting 580 from 1100 once leaves 520 which is the first new defect count number. Subtracting 600, the normal sector length or frequency, from 520 once leaves negative 80. Therefore, the microprocessor 142 determines that two subtractions from the byte number were necessary and the defect lies in the second normal sector. The byte position of the error within the normal sector is the last new defect count number that was subtracted from when reaching a negative number, or 520 in this case. The microprocessor 142 now knows that normal sector two and byte position 520 of the current track area has a defect.

After the sector and byte position are determined, query operation 408 detects whether the sector containing the defect has already been marked unusable. The sector could have been previously marked if an error in the sector precedes the present error and that preceding error caused the sector to be marked. As will be discussed below, the sector also could have been previously marked unusable if the sector before it contained a defect which was too close to the beginning of the current sector. Marking the sector unusable in this fashion prevents the sector from failing in the future if the defect in the preceding sector grows into the PLO and/or sync byte of the current sector. In one embodiment, the sector is marked unusable if the defect lies in the PLO section, the sync byte section, or the ECC section. In this embodiment, it is assumed that defects in the data section can be compensated for by the ECC. Other embodiments may further discriminate the defects and the section they lie within before marking the sector as unusable.

If query operation 408 detects that the normal sector has not been marked, then operation moves to mark operation 410. This operation flags the current normal sector determined in operation 406 as unusable. Then control moves to query operation 412. If query operation 408 detects that the normal sector has already been marked, then control bypasses mark operation 410 and proceeds directly to query operation 412.

If the relative size of the defect is given consideration, the microprocessor 142 could then determine the length of the defect by finding the number of consecutive error bytes from the read/write channel that were fed to the buffer. A query operation could be inserted between query operation 408 and mark operation 410 to illustrate this step. This query operation would determine whether the defect is significant by comparing its size to the known minimum size of a significant defect known for the section containing the defect. For significant defects, operation would move to mark operation 410. For insignificant defects, control would proceed directly to query operation 412.

Rather than moving directly to query operation 416 to determine whether the large sector contains any more errors, control moves to query operation 412 which tests whether the error is located too close to the beginning of the next normal sector. The distance threshold used to decide whether the error is too close is a design choice. Typically, this distance threshold value will be set between 10 and 15 bytes and should increase with an increase in byte density. Therefore, if the defect lies within the chosen number of bytes before the beginning of the trailing normal sector, the defect is too close and operation moves to mark operation 414. This operation flags the trailing normal sector as unusable and failures due to the growth of the trailing normal sector are thereby avoided. Control then moves to query operation 416.

If query operation 412 decides that the defect is not within the chosen number of bytes preceding the trailing normal sector, the trailing normal sector will not be marked unusable and control continues directly to query operation 416. At query operation 416, the microprocessor 142 decides whether the current large sector contains any more errors. If so, control returns to the error operation 404. If the large sector contains no more errors, then the routine for the current large sector track area ends. The microprocessor 142 will restart the routine for the next large sector unless all large sector track areas have already been analyzed.

Once the normal sectors have properly been marked as usable or unusable, the microprocessor knows whether they should be skipped after formatting when reading and writing user data to the storage media. Disc drives failures are avoided by marking the normal sectors with errors as unusable. Future disc drive failures are avoided by marking the normal sectors that trail normal sectors currently having errors as unusable when the errors are too close to the normal trailing sectors. It is not necessary to detect whether the defects lie too closely to the end of a preceding normal sector to decide whether to also mark the preceding normal sector as unusable. The ECC portion of the preceding normal sector can account for errors that grow into the ECC portion of that preceding normal sector.

The exemplary embodiments of the invention include a method for mapping defects on the storage media of a disc drive. The method includes the act of calculating a position of a defect 406. A current sector corresponding to the position of the defect is flagged as unusable 410. A distance of the defect's position to a sector adjacent to the current sector is compared against a distance threshold 412. The adjacent sector is flagged as unusable when the distance is less than the distance threshold 414.

These exemplary embodiments also include a control system that maps defects on a storage media of a disc drive. The control system includes a read/write channel 146 that reads a signal from the storage media to detect a defect and the defect's location. A processor 142 calculates the position of the defect on the storage media as a function of the defect location. The processor 142 flags a sector corresponding to the position of the defect as unusable and compares against a distance threshold a distance of the defect to an adjacent sector. The processor 142 flags the adjacent sector as unusable when the distance is less than the distance threshold.

Also included in the exemplary embodiments is another method for mapping defects on the storage media of a disc drive. The method involves creating a plurality of large sectors to fill the storage media 328. Reference data is written to the large sectors 328 to produce stored data. The stored data is read back 334 and compared to the reference data to detect errors. The byte number of each defect is found 334. The normal sector and byte position of the defect is calculated 406 by subtracting the sector frequency from the defect's byte number. A normal sector corresponding to the position of a defect is flagged as unusable 410. The method may further include comparing a distance of the defect to an adjacent sector against a distance threshold 412. The adjacent sector is flagged as unusable when the distance is less than the distance threshold 414.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for mapping defects on the storage media of a disc drive comprising steps
   a) calculating a position of a defect;
   b) comparing against a distance threshold a distance of the position of the defect to a sector adjacent to a current sector containing the defect; and
   c) flagging the adjacent sector as unusable when the distance is less than the distance threshold.

2. The method of claim 1, further comprising a step (d) of flagging the current sector containing the defect as unusable.

3. The method of claim 2, further comprising steps of:
   d)(i) detecting whether the position of the defect permits compensation by an error correcting code; and
   d)(ii) flagging the current sector containing the defect as unusable when compensation is not possible.

4. The method of claim 1, further comprising steps of:

e) writing a test pattern to the storage media;

f) reading the test pattern to produce a read signal; and g) comparing the read signal against a signal threshold to detect a defect.

5. The method of claim 4, wherein the test pattern is a 2T pattern.

6. The method of claim 4, wherein the disc drive has a buffer and the step (e) of writing a test pattern to the storage media comprises steps of:

e(i) storing programming and the test pattern in the buffer; and e(ii) executing the programming to retrieve the test pattern from the buffer and write the test pattern to the storage media.

7. The method of claim 1, wherein the distance threshold is 15 bytes.

8. The method of claim 1, wherein calculating step (a) comprises steps of:

a)(i) repeatedly performing a subtraction of a number of bytes corresponding to a normal sector length from an initial defect count number to produce a new defect count number after each subtraction and repeating the subtraction until reaching zero or going negative;

a)(ii) counting a number of subtractions necessary to reach zero or go negative to find a defective normal sector; and a)(iii) storing a last new defect count number produced before reaching zero or going negative to find a defective byte position within the defective normal sector.

9. A control system that maps defects on a storage media of a disc drive, comprising:

a read/write channel that reads a signal from the storage media to detect a defect and a location of the defect within a current sector; and a processor that calculates a position of the defect on the storage media as a function of the location of the defect, compares against a distance threshold a distance of the position of the defect to a sector adjacent to a current sector containing the defect, and flags the adjacent sector as unusable when the distance is less than the distance threshold.

10. The control system of claim 9, wherein the processor flags the current sector containing the defect as unusable when the defect lies in a position that cannot be compensated for by an error correction code.

11. The control system of claim 10, wherein the processor is configured to detect whether an error correction code can compensate for the defect and flag the current sector containing the defect as unusable when compensation is not possible.

12. The control system of claim 9, further comprising:

a buffer that stores a test pattern and programming for the processor;

a sequencer that receives the test pattern from the buffer, provides the test pattern to the read/write channel, and instructs the read/write channel to write the test pattern.

13. The control system of claim 12, wherein the test pattern is a 2T pattern.

14. The control system of claim 9, wherein the processor is configured to calculate the position of the defect by repeatedly performing a subtraction of a number of bytes corresponding to a normal sector length from a defect count number to produce a new defect count number after each subtraction and repeating the subtraction until reaching zero or going negative, counting a number of subtractions necessary to reach zero or go negative to find a defective normal sector, and storing a last new defect count number produced before reaching zero or going negative to find a defective byte position within the defective normal sector.

15. A method for mapping defects on the storage media of a disc drive, the method comprising steps of:

a) creating a plurality of adjacent test sectors to fill the storage media;

b) writing a reference data to the test sectors to produce stored data;

c) reading the stored data contained by the test sectors;

d) comparing the stored data that is read to the reference data to detect defects;

e) storing a byte number for each defect;

f) subtracting a sector frequency from the byte number for a defect to find a normal sector position of the defect; and g) flagging a normal sector corresponding to the normal sector position as unusable.

16. The method of claim 15, further comprising steps of:

h) comparing against a distance threshold a distance of the normal sector position of the defect to an adjacent normal sector that is adjacent to a current normal sector containing the defect; and i) flagging the adjacent normal sector as unusable when the distance is less than the distance threshold.

17. A control system that maps defects on a storage media of a disc drive, comprising:

a read/write channel that reads a signal from the media and compares the signal to a signal threshold to detect a defect within a current sector; and means for communicating with the read/write channel to flag a sector that is adjacent to the current sector as unusable.

* * * * *